(12) United States Patent
Diallo et al.

(10) Patent No.: US 11,104,770 B2
(45) Date of Patent: *Aug. 31, 2021

(54) SYSTEMS AND METHODS TO PRODUCE TREATED CELLULOSE FILAMENTS AND THERMOPLASTIC COMPOSITE MATERIALS COMPRISING TREATED CELLULOSE FILAMENTS

(71) Applicant: KRUGER INC., Montreal (CA)

(72) Inventors: Abdou Khadri Diallo, Lasalle (CA); Claire Jahier, Lasalle (CA); Daniel Montplaisir, Trois-Rivieres (CA)

(73) Assignee: KRUGER INC., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,224

(22) Filed: Apr. 7, 2020

(65) Prior Publication Data

US 2020/0239650 A1  Jul. 30, 2020

Related U.S. Application Data

(63) Continuation of application No. 15/658,935, filed on Jul. 25, 2017, now Pat. No. 10,626,232.

(51) Int. Cl.
*C08J 5/06* (2006.01)
*C08J 3/00* (2006.01)
(Continued)

(52) U.S. Cl.
CPC ............... *C08J 5/045* (2013.01); *C08J 3/005* (2013.01); *D21C 5/00* (2013.01); *D21C 7/00* (2013.01);
(Continued)

(58) Field of Classification Search
USPC ..................... 162/72, 77; 524/35; 528/502 A
See application file for complete search history.

(56) References Cited

U.S. PATENT DOCUMENTS 2,892,729 A * 6/1959 Howsmon ................. D01F 2/10
106/166.52
3,605,224 A  9/1971 Riley et al.
(Continued)

OTHER PUBLICATIONS

International Search Report dated Aug. 23, 2018, 4 Pages; for Corresponding PCT Application No. PCT/CA2018/050850.
Written Opinion dated Aug. 23, 2018, 3 Pages; for Corresponding PCT Application No. PCT/CA2018/050850.

*Primary Examiner* — Fred M Teskin

(57) ABSTRACT

A method and system to produce treated Cellulose Filaments (CF) and CF products are provided. Feedstock comprising CF in a water solution are mixed with a debonder to produce a mixed stream. The mixed stream is filtered yielding separate filtered and filtrate streams. The filtrate stream comprises at least a portion of the debonder. The filtered stream is dried to produce treated CF. The debonder is one of an alcohol, glycol ether, ester-containing quaternary ammonium salt, amido amine quaternary ammonium salt, disubstituted amide or a mixture thereof. The filtrate stream may be recycled. The mixed stream may be washed before filtering to remove debonder. A thermoplastic polymer-treated Cellulose filament composite material is formable by associating the treated CF with a thermopolymer such as polyolefin, polyurethane (PU), polypropylene (PP), polyester (PE), polylactic acid (PLA), polyhydroxyalkanoates (PHA), polyamide (PA), and ethylene vinyl acetate (EVA) or a mixture.

29 Claims, 13 Drawing Sheets

(51) Int. Cl.
    *D21H 17/46* (2006.01)
    *D21H 17/06* (2006.01)
    *D21H 21/22* (2006.01)
    *D21H 17/34* (2006.01)
    *D21H 17/07* (2006.01)
    *D21H 11/18* (2006.01)
    *D21H 17/66* (2006.01)
    *D21C 5/00* (2006.01)
    *D21C 7/00* (2006.01)
    *D21C 7/08* (2006.01)
    *C08J 5/04* (2006.01)

(52) U.S. Cl.
    CPC ............... *D21C 7/08* (2013.01); *D21H 11/18* (2013.01); *D21H 17/06* (2013.01); *D21H 17/07* (2013.01); *D21H 17/34* (2013.01); *D21H 17/46* (2013.01); *D21H 17/66* (2013.01); *D21H 21/22* (2013.01); *C08J 2323/06* (2013.01); *C08J 2323/12* (2013.01); *C08J 2401/02* (2013.01)

(56) References Cited

U.S. PATENT DOCUMENTS

| | | | | |
|---|---|---|---|---|
| 5,601,771 A | * | 2/1997 | Ruf | ........................ D01D 5/088 |
| | | | | 264/187 |
| 10,626,232 B2 | * | 4/2020 | Diallo | ...................... D21C 5/00 |
| 2011/0277947 A1 | | 11/2011 | Hua et al. | |
| 2013/0017394 A1 | | 1/2013 | Hua et al. | |
| 2014/0048222 A1 | | 2/2014 | Li et al. | |
| 2017/0282467 A1 | | 10/2017 | Dorris et al. | |
| 2018/0002864 A1 | | 1/2018 | Ziegenbein | |

* cited by examiner

SYSTEMS AND METHODS TO PRODUCE TREATED CELLULOSE FILAMENTS AND THERMOPLASTIC COMPOSITE MATERIALS COMPRISING TREATED CELLULOSE FILAMENTS

CROSS-REFERENCE

This application is a continuation of U.S. patent application Ser. No. 15/658,935 filed Jul. 25, 2017, now issued as U.S. Pat. No. 10,626,232 B2 on Apr. 21, 2020, the contents of which are incorporated herein by reference.

FIELD

The present matter relates to systems and methods to produce dry dispersed Cellulose Filaments and thermoplastic composite materials comprising dry dispersed Cellulose Filaments.

BACKGROUND

Cellulose Filaments are one type of cellulose fibre made in a mechanical process in an aqueous suspension without the use of chemicals or enzymes. In this process, cellulose fibres (typically softwood kraft fibers) are split along their longest axis into over 1,000 Cellulose Filaments. The resulting Cellulose Filaments have similar fibre length and a high aspect ratio (e.g. a fibre length between 100 μm and 2,000 μm and a width between 30 nm and 500 nm). Typical solids levels for the finished product aqueous suspension of Cellulose Filaments generally range from 25% to 45% (most commonly ~30%).

Cellulose Filaments are very hydrophilic and can be easily dispersed in water. Cellulose Filaments have a high density of —OH (hydroxyl) groups on their surface resulting in a strong tendency to form hydrogen bonds with each other. Uncontrolled drying of Cellulose Filaments leads to solid Cellulose filaments "blocks" that are non-dispersible. However, due to their high surface area, strength characteristics, size and aspect ratio, Cellulose Filaments are an excellent candidate for making lightweight composite materials.

Recently, the use of natural fibers such as cellulose as reinforcing agents in polymer composite materials has become of great interest. Natural cellulose-based fibers have the advantage of being low-cost, biodegradable, renewable, low density (compared to glass and other synthetic fibers) and high specific stress and modulus.

However, natural fibers such as cellulose are generally not compatible with a hydrophobic polymer matrix. Rather, natural fibres such as cellulose tend to be hydrophilic and therefore form aggregates during processing with hydrophobic polymer matrices. For example, due to this lack of compatibility with hydrophobic matrices, incorporation of hydrophilic cellulose in thermoplastic composites leads to aggregation of cellulose therein. Further, natural fibres such as cellulose generally have high moisture/water absorption properties that limit potential use in certain applications, such as in hydrophobic polymer matrices.

In the paper-making industry, high amounts of energy are typically required to fiberize pulp as pulp generally possesses strong inter-fiber hydrogen bonding. To reduce energy costs, efforts have been made to reduce hydrogen bonding among fibres in pulp lower the fiberization energy requirement during paper-making by adding organic and/or inorganic chemicals called debonders. Typically, debonders that have been used for this purpose are surfactants (e.g. substances that tends to reduce the surface tension of a liquid in which it is dissolved).

Accordingly, there is a need for improved systems and methods for the dispersion of cellulose-based fibres such as Cellulose Filaments in thermoplastic matrices as a high dispersion of cellulose-based fibres in thermoplastic matrices is needed to obtain well-defined mechanical properties of resulting composite materials.

SUMMARY

A method and system to produce treated Cellulose Filaments (CF) and CF products are provided. Feedstock comprising CF in a water solution is mixed with a debonder to produce a mixed stream. The debonder is one of an alcohol, glycol ether, ester-containing quaternary ammonium salt, amido amine quaternary ammonium salt, disubstituted amide or a mixture thereof. The mixed stream is filtered yielding separate filtered and filtrate streams. The filtrate stream comprises at least a portion of the debonder and may be recycled. The filtered stream is dried to produce treated CF. The mixed stream may be washed before filtering to remove debonder. A thermoplastic polymer-treated Cellulose filament composite material is formable by associating the treated CF with a thermopolymer such as polyolefin, polyurethane (PU), polypropylene (PP), polyester (PE), polylactic acid (PLA), polyhydroxyalkanoates (PHA), polyamide (PA), and ethylene vinyl acetate (EVA) or a mixture.

During the mixing stage the debonder may adsorb to a surface of the Cellulose Filaments in a manner such that the debonder physically blocks the hydroxyl groups on the surface of the Cellulose Filaments from contacting adjacent Cellulose Filaments, thereby weakening the effects of hydrogen bonding between hydroxyl groups of adjacent Cellulose Filaments.

In one aspect, there is provided a method comprising: mixing a feedstock comprising Cellulose Filaments in a water solution with a debonder to produce a mixed stream; filtering the mixed stream to produce a filtered stream and a filtrate stream, the filtrate stream comprising at least a portion of the debonder; and drying the filtered stream to produce treated Cellulose Filaments; wherein the debonder is one of an alcohol, glycol ether, ester-containing quaternary ammonium salt, amido amine quaternary ammonium salt, disubstituted amide or a mixture thereof.

During mixing, the debonder adsorbs to a surface of the Cellulose Filaments in a manner such that the debonder physically blocks hydroxyl groups on the surface of the Cellulose Filaments from contacting adjacent Cellulose Filaments, thereby weakening the effects of hydrogen bonding between hydroxyl groups of adjacent Cellulose Filaments.

The Cellulose Filaments in the feedstock may comprise individual fine threads unraveled or peeled from natural cellulose fibers having a fibrillar element width ranging from nanoscale (30 to 100 nm) to microscale (100 to 500 nm) and an aspect ratio of up to 5,000.

The feedstock may have a solids content of 30% Cellulose Filaments by weight.

The method may comprise, after mixing and before filtering, washing the mixed stream with a washing alcohol or organic solvent to remove remaining debonder. In such a case, the debonder may comprise one of an ester-containing quaternary ammonium salt, an amido amine quaternary ammonium salt and a disubstituted amide.

The method may further comprise recovering the debonder from the filtrate stream and recycling the debonder to the mixing stage.

The method may comprise drying the filtered stream in two stages.

The method may further comprise associating the treated Cellulose Filaments and a thermoplastic polymer to produce a thermoplastic polymer-treated Cellulose Filaments composite material.

The composite material may comprise 10 to 40% by weight treated Cellulose Filaments.

Associating may comprise mixing the treated Cellulose Filaments and the thermoplastic polymer to form a mixture and extruding the mixture.

The thermoplastic polymer may be one of a polyolefin, polyurethane (PU), polypropylene (PP), polyester (PE), polylactic acid (PLA), polyhydroxyalkanoates (PHA), polyamide (PA), and ethylene vinyl acetate (EVA) or a mixture. The polyolefin may comprise a polyethylene and wherein the polyethylene comprises low-density polyethylene (LDPE), linear low density polyethylene (LLDPE), maleated thermoplastic starch (mTPS) in LLDPE and high-density polyethylene (HDPE).

The thermoplastic polymer may be PA and the composite material comprise 30% by weight treated Cellulose Filaments. The composite material may have a Young's Modulus gain of 181% compared to the thermoplastic polymer alone. The composite material may have a tensile stress gain of 73% compared to the thermoplastic polymer alone.

In one aspect, there is provided A system to produce treated Cellulose Filaments. The system comprises: a mixing stage for mixing a feedstock comprising Cellulose Filaments in a water solution with a debonder to produce a mixed stream; a filtering stage for filtering the mixed stream to produce a filtered stream and a filtrate stream, the filtrate stream comprising at least a portion of the debonder; and a drying stage for drying the filtered stream to produce the treated Cellulose Filaments. The debonder is one of an alcohol, glycol ether, ester-containing quaternary ammonium salt, amido amine quaternary ammonium salt, disubstituted amide or a mixture thereof.

During the mixing stage the debonder may adsorb to a surface of the Cellulose Filaments in a manner such that the debonder physically blocks the hydroxyl groups on the surface of the Cellulose Filaments from contacting adjacent Cellulose Filaments, thereby weakening the effects of hydrogen bonding between hydroxyl groups of adjacent Cellulose Filaments.

The mixing stage may include a mixing vessel comprising a planetary mixer or a continuous high consistency pulp mixer.

The mixing stage and filtering stage may be combined such that the mixing vessel is configured with a filter providing the filtering stage.

The filtering stage may comprise one of a Nutsche filter and a Buchner filter.

The drying stage may comprises one of a vacuum drying chamber, convection oven or Nutsche filter.

The system may be configured to add a washing alcohol or organic solvent to the mixed stream to wash remaining debonder from the Cellulose Filaments of the mixed stream prior to filtering by the filtering stage.

The system may further comprise a recycling stage configured to recover the debonder and recycle the debonder to the mixing stage.

In one aspect there is provided a Cellulose Filaments product comprising treated Cellulose Filaments, the product produced in accordance with a method aspect described herein. The method may comprise: mixing a feedstock comprising Cellulose Filaments in a water solution with a debonder to produce a mixed stream; filtering the mixed stream to produce a filtered stream and a filtrate stream, the filtrate stream comprising at least a portion of the debonder; and drying the filtered stream to produce the treated Cellulose Filaments. The debonder is one of an alcohol, glycol ether, ester-containing quaternary ammonium salt, amido amine quaternary ammonium salt, disubstituted amide or a mixture thereof. The product may be a thermoplastic polymer-treated Cellulose Filaments composite material.

In one aspect there is provide a method to produce a thermoplastic polymer-treated Cellulose Filaments composite material product comprising: associating treated Cellulose Filaments with a thermopolymer to create a composite material; wherein the treated Cellulose Filaments comprise Cellulose Filaments having individual fine threads unraveled or peeled from natural cellulose fibers having a fibrillar element width ranging from nanoscale (30 to 100 nm) to microscale (100 to 500 nm) and an aspect ratio of up to 5,000 and that have been treated with a debonder comprising one of an alcohol, glycol ether, ester-containing quaternary ammonium salt, amido amine quaternary ammonium salt, disubstituted amide or a mixture thereof.

The composite material may comprise 10 to 40% by weight treated Cellulose Filaments. Associating may comprise mixing the treated Cellulose Filaments and the thermoplastic polymer to form a mixture and extruding the mixture.

The thermoplastic polymer may be one of a polyolefin, polyurethane (PU), polypropylene (PP), polyester (PE), polylactic acid (PLA), polyhydroxyalkanoates (PHA), polyamide (PA), and ethylene vinyl acetate (EVA) or a mixture. The polyolefin may comprise a polyethylene and wherein the polyethylene comprises low-density polyethylene (LDPE), linear low density polyethylene (LLDPE), maleated thermoplastic starch (mTPS) in LLDPE and high-density polyethylene (HDPE). The thermoplastic polymer may be PA and the composite material comprise 30% by weight treated Cellulose Filaments. The composite material may have a Young's Modulus gain of 181% compared to the thermoplastic polymer alone. The composite material may have a tensile stress gain of 73% compared to the thermoplastic polymer alone.

BRIEF DESCRIPTION OF THE DRAWINGS

In order that the subject matter may be readily understood, embodiments are illustrated by way of examples in the accompanying drawings, in which.

DETAILED DESCRIPTION

The description references various embodiments and examples unless it is explicitly stated or it is logically incongruous otherwise, aspects or features of any individual embodiment or example applies to the other embodiments and examples. The term "cellulose" as used herein refers to a long-chain polymer polysaccharide carbohydrate comprised of β-glucose monomer units, of formula $(C_6H_{10}O_5)_n$, usually found in plant cell walls in combination with lignin and any hemicelluloses, and therefore, the term cellulose also includes hemicelluloses. Sources of cellulose may include any plant material containing cellulose, paper-products, waste streams containing cellulose, such as carbohydrate waste, etc.

The cellulosic structures referred to as Cellulose Filaments herein are produced from natural cellulose fibers. Cellulose Filaments are neither cellulosic fibril bundles nor fibers branched with fibrils or separated short fibrils. Rather, Cellulose Filaments are individual fine threads unraveled or peeled from natural cellulose fibers. Cellulose Filaments are much longer than nanofibres, microfibrils, or nano-celluloses as denoted in the prior art. Cellulose Filaments consist of a distribution of fibrillar elements of very high length (e.g. up to millimeters) compared to materials denoted microfibrillated cellulose, cellulose microfibrils, nanofibrils or nanocellulose. Their widths range from the nano size (e.g. 30 to 100 nm) to the micro size (100 to 500 nm). Herein Cellulose Filaments comprise a width of about 30 to 300 nanometers and a length of at least 100 □m and up to 2 mm, thus possessing an extremely high aspect ratio, typically of at least 200 and up to a few thousands. Because of their high aspect ratio, Cellulose Filaments form a gel-like network in aqueous suspension at a very low consistency. The stability of the network can be determined by a settlement test described by Weibel and Paul (UK Patent Application GB 2296726), for example.

Figure 1A:
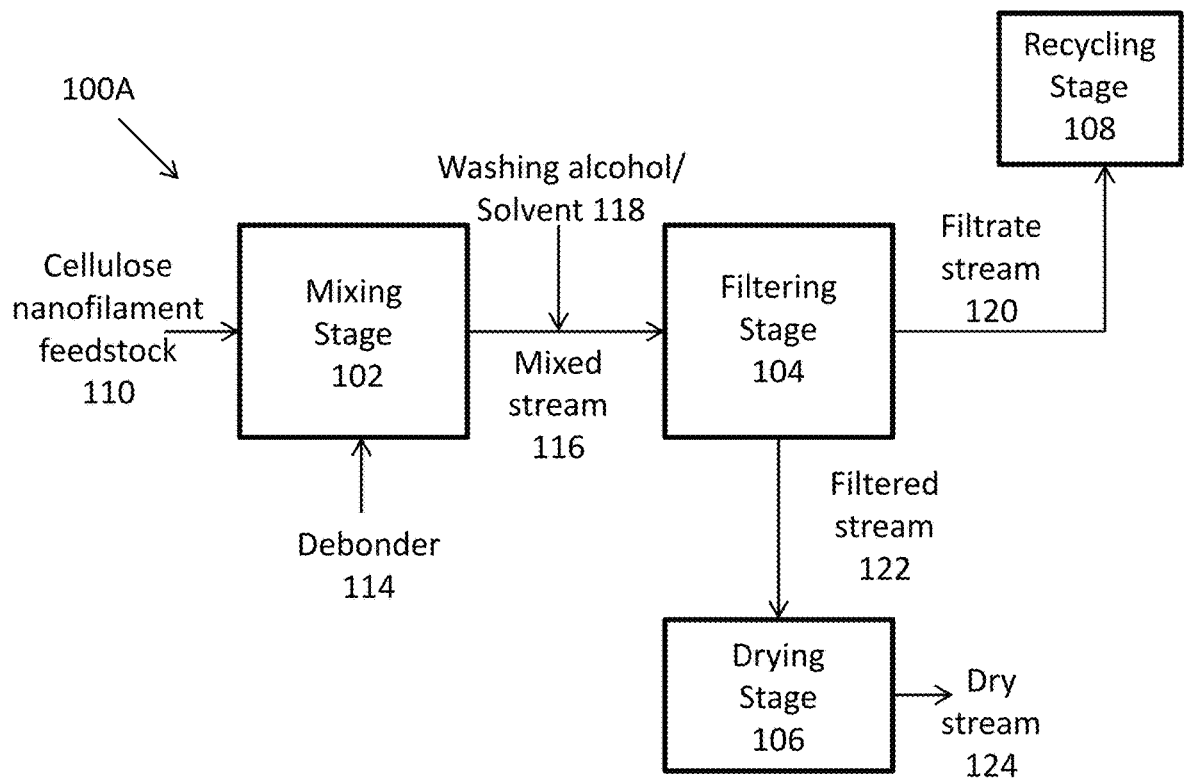
FIGS. 1A and 1B are block diagrams illustrating embodiments of a system for producing treated Cellulose Filaments.
Figure 1B:
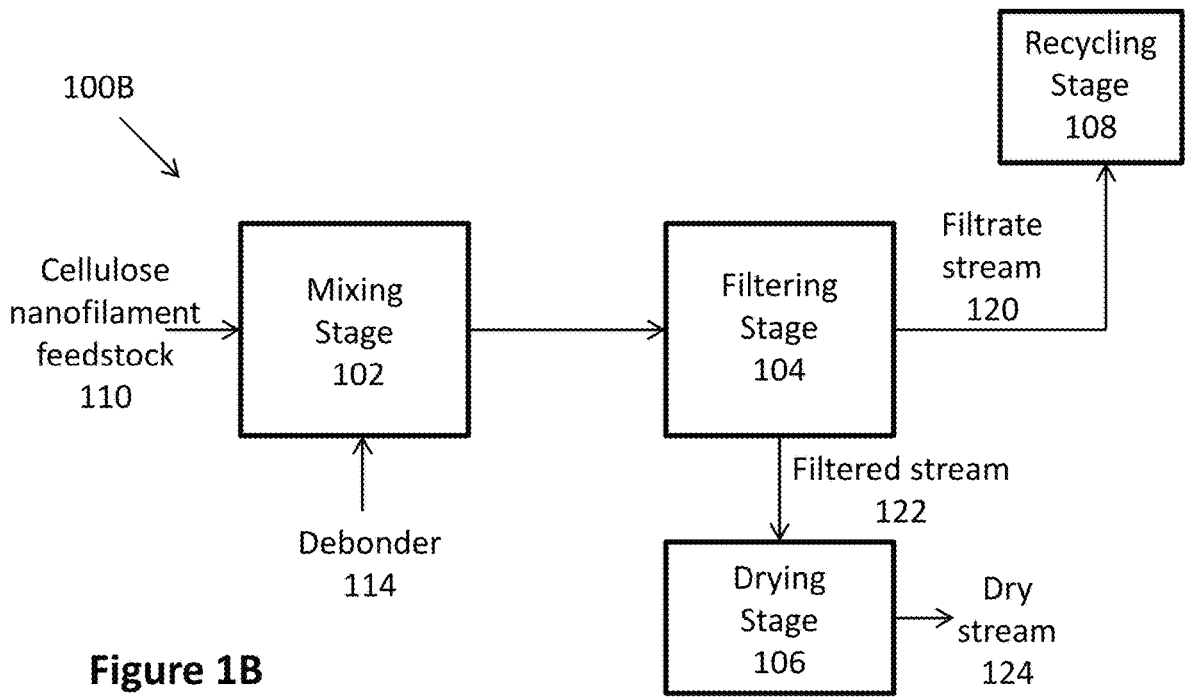

FIGS. 1A and 1B show embodiments of a system for producing dry dispersed Cellulose Filaments according to some of the embodiments described herein. Generally, system 100A and 100B comprises a mixing stage 102, a filtering stage 104 and a drying stage 106.

At mixing stage 102, a feedstock of Cellulose Filaments (e.g. in solution) 110 is mixed with a debonder 114 to form a mixed stream 116.

Filtering stage 104 follows mixing stage 102. At filtering stage 104, mixed stream 116 is filtered to form a filtered stream 122 and a filtrate 120.

Optionally, as shown in system 100A of FIG. 1A, after mixing stage 102 and prior to filtering stage 104, a washing alcohol or organic solvent 118 can be added to mixed stream 116 to wash the Cellulose Filaments therein.

Drying stage 106 follows filtering stage 104. At drying stage 106, filtered stream 122 is dried to form a treated stream 124 comprising dry dispersed Cellulose Filaments.

In some embodiments of system 100A and 110B, mixing stage 102, filtering stage 104 and the aforementioned optional washing of Cellulose Filaments in mixed stream 116 with washing alcohol 118 can take place in a single mixing vessel wherein feedstock 110 is mixed with debonder 114 and kept in suspension or solution (e.g. by stirring or agitation or shaking) while, optionally, washing alcohol 118 is added to form mixed stream 116. Mixed stream 116 can subsequently be filtered (e.g. using a Buchner filter) to form filtered stream 122.

Mixing Stage 102

As shown in FIGS. 1A and 1B and according to one embodiment at mixing stage 102, a Cellulose filaments feedstock 110 is mixed with a debonder 114 which may optionally include a first alcohol 112 as a debonder in a mixing vessel. As described further below certain debonders may be mixed with alcohol and in some embodiments, alcohol alone is used as a debonder. The width of the distribution of fibrillar elements comprising the Cellulose Filaments in feedstock 110 can range from nanoscale (e.g. 30 to 100 nm) to microscale (e.g. 100 to 500 nm). The aspect ratio of the Cellulose Filaments used herein can be up to 5,000 and typically is 400 to 1,000.

Cellulose Filament feedstock 110 may be 25%-45% solids, most commonly Cellulose Filaments feedstock 110 is 30% solids (by dry weight Cellulose Filaments). It is understood that a lower % below 25% is possible, but efficiency/economy may suffer.

Debonder 114 is added to feedstock 110 during mixing stage 102 to inhibit aggregation of Cellulose Filaments and promote dispersion of Cellulose Filaments when the Cellulose Filaments are put into use (e.g. as a strengthener in paper forming applications). In one embodiment, during mixing stage 102, debonder 114 adsorbs to a surface of the Cellulose Filaments in a manner such that debonder 114 physically blocks the hydroxyl groups on the surface of the Cellulose Filaments from contacting hydroxyl groups on the surface of adjacent Cellulose Filaments thereby weakening the effects of hydrogen bonding between hydroxyl groups of adjacent Cellulose Filaments. Weakening of inter-filament hydrogen bonding and/or formation of a hydrophobic cloud surrounding debonder-treated Cellulose Filaments can facilitate individual Cellulose Filaments to be more readily dispersible in solution and can inhibit individual Cellulose Filaments from clustering, particularly after the mechanical mixing action of mixing stage 102 ceases.

In one embodiment, debonder 114 can comprise any one of the following classes of debonders: alcohols, glycol ethers, ester-containing quaternary ammonium salts, amido amine quaternary ammonium salts, disubstituted amides, debonding mixtures. Combinations are also likely given the properties of the debonders.

In one embodiment, debonder 114 is an alcohol according to chemical structure (I) provided below, wherein $R_1$ is alkyl group.

$$R_1-OH \qquad (I)$$

Examples of alcohols than can be used as debonder 114 include but are not limited to methanol, ethanol, and butanol. Others such as propanol and isopropanol are expected to be effective as well. When debonder 114 is an alcohol, first alcohol 112 may be unnecessary and not added.

In another embodiment, debonder 114 is glycol ether compound according to chemical structure (II) provided below.

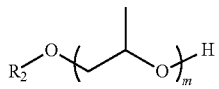

(II)

In this embodiment, $R_2$ can be methyl, propyl or butyl groups and m can be from 1 to 3. An example of a glycol ether compound that can be used as debonder 114 includes but is not limited to Dowanol™ P-series glycol ether supplied by the Dow Chemical Company.

In another embodiment, debonder 114 is an ester-containing quaternary ammonium salt or "ester quats" compound according to chemical structure (III) provided below.

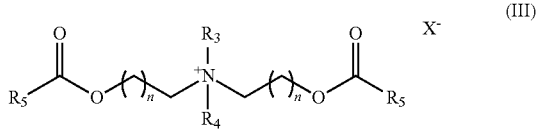

(III)

In this embodiment, $R_3$ and $R_4$ can be the same or different and are $C_{1-6}$ hydrocarbyl or hydroxyalkyl group, n can be from 1 to 6, preferably 1 to 2. Each $R_5$ can be the same or different and is a linear or branched $C_{5-35}$ alkyl or alkenyl chain preferably more than 11 atoms such as tallow, and X can be an anion such as but not limited to chloride, bromide, methyl sulfate, ethyl sulfate, formate, acetate, carbonate, sulfate, nitrate and other like anions. In one preferred embodiment, X is methyl sulfate. An example of an ester-containing quaternary ammonium salt that can be used as debonder 114 includes but is not limited to Stepantex® VT-90 supplied by Stepan Company.

In another embodiment, debonder 114 is an amido amine quaternary ammonium salt compound according to chemical structure (IV) provided below.

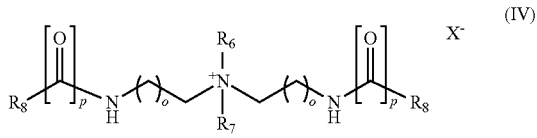

(IV)

In this embodiment, $R_6$ and $R_7$ can be the same or different are $C_{1-6}$ akyl or hydroxyalkyl group, o can be from 1 to 6, preferably 1 to 2, p can be 0 or 1, each $R_8$ can be the same or different and can be a linear or branched alkyl or alkenyl chain comprising of at least 7 atoms and preferably more than 11 atoms such as tallow, and X can be an anion such as but not limited to chloride, bromide, methyl sulfate, ethyl sulfate, formate, acetate, carbonate, sulfate, nitrate and other like anions. In one preferred embodiment, X is methyl sulfate. An example of an amido amine quaternary ammonium salt that can be used as debonder 114 includes but is not limited to Accosoft® 501 supplied by Stepan Company.

In another embodiment, debonder 114 can be a disubstituted amide according to chemical structure (V) provided below.

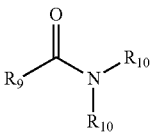

(V)

In this embodiment, $R_9$ can be a saturated or unsaturated alkyl chain and Rio can be a saturated alkyl chain. An example of a disubstituted amide that can be used as debonder 114 includes but is not limited to N,N-dimethyl 9-decenamide (e.g. Steposol® MET-10U supplied by Stepan Company).

In one embodiment, debonder 114 can be a mixture having two or more components. In one embodiment, debonder 114 is a mixture comprising two components, a first component being an alcohol according to chemical structure (I) noted above and a second component being a compound according to any one of chemical structures (II) to (V) noted above (e.g. glycol ethers, an ester-containing quaternary ammonium salts, amido amine quaternary ammonium salts and disubstituted amides). The first component and the second component of debonder 114 can be added together or added separately to feedstock 110 at mixing stage 102.

In one embodiment, debonder 114 is polyethylene glycol butyl ether (PGBE).

In one embodiment, debonder 114 is mixed at mixing stage 102 with feedstock 110 as feedstock 110 is constantly agitated and/or mixed within a mixing vessel. Debonder 114 can be mixed at mixing stage 102 with feedstock 110 such that the resulting mixed stream 116 has a ratio of 2.5 grams of debonder 114 to 1 gram of dry Cellulose Filaments in feedstock 110.

In another embodiment, debonder 114 as a debonding mixture of alcohol (e.g. ethanol) and another debonder can be added to the mixing vessel in a range of ratios between 1:4 to 4:1. In one embodiment the ratio of alcohol to other debonder is 1:1.

In one embodiment, the mixing vessel can be maintained at a temperature within a range from 20° C. to 50° C. but below 30° C. is preferred.

In one embodiment, a retention time of feedstock 110 and debonder 114 in the mixing vessel (e.g. Nutsche filter with recirculation) can vary within a range of 15 min. to 24 hr and between 15 min. to 1 hr is preferred.

While a suitable mixing vessel may include a Nutsche filter with recirculation however any continuous high consistency pulp mixer may be utilized. If a planetary mixer with Nutsche filter is used, it can take between 30 min. and 2 hr at low shear. If a continuous pulp mixer is used, it may take only a few seconds at high shear.

In one specific embodiment, feedstock 110 can be added to the mixing vessel (with Nutsche filter) and debonder 114 as a mixture of PGBE and ethanol can be subsequently added to the mixing vessel. The resulting solution can be stirred for 1 hour while being maintained at about 20° C.

In one specific example, 333 grams of feedstock 110 (comprising 100 grams of dry Cellulose Filaments) and debonder 114 as a mixture comprising 130 mL of ethanol and 130 mL of PGBE can be mixed in a cake mixer for 1 hour at about 20° C.

In one specific example, 333 grams of feedstock 110 (comprising 100 grams of dry Cellulose Filaments) and debonder 114 as a 1.72 L of PGBE can be mixed in a cake mixer for 15 min at about 20° C.

Filtering Stage 104

Mixed stream 116 comprises Cellulose Filaments treated with debonder 114 in solution. Mixed stream 116 may also comprise remaining debonder 114 in solution. At filtering stage 104, the components of mixed stream 116 are filtered into filtrate stream 120 and washed stream 122, where Cellulose Filaments treated with debonder 114 substantially comprise washed stream 122. Nutsche or Buchner filters may be used for example.

In one embodiment, mixed stream 116 can optionally be washed with a washing alcohol or organic solvent 118 prior to filtering stage 104. Organic solvents such as acetone, dichloromethane or diethyl ether may be used but alcohols as described above are preferred. During filtering stage 104, after debonder 114 has adsorbed to the surface of the Cellulose Filaments in a manner that physically blocks the hydroxyl groups on the surface of the Cellulose Filaments from contacting hydroxyl groups on adjacent Cellulose Filaments, washing alcohol/organic solvent 118 can be added to mixed stream 116 to remove remaining debonder 114 from the Cellulose Filaments therein. When debonders of chemical structures (III) to (V) are used they are typically washed.

In one embodiment, washing alcohol 118 can be added to mixed stream 116 in a ratio from 6.7% to 9.4% CF (w/w) in ethanol: between 120 and 231 ml of ethanol for 20 g of dry CF.

In one example, 1.8 L of washing alcohol 118 can be added to mixed stream 116 prior to filtering stage 104 for each kilogram of dry Cellulose Filaments in feedstock 110.

In one embodiment, mixed stream 116 can be filtered into filtrate stream 120 and washed stream 122 using a Buchner filter.

It should be noted that any one or more of debonder 114 and washing alcohol 118 can be recovered in an optional recycling stage 108. For example, in one embodiment, at recycling stage 108, filtrate 120 can undergo further processing (not shown) to separate debonder 114 from washing alcohol 118 as well as to separate any one or more of the first and second components of debonder 114 comprising a mixture for recycling within system 100. In a further embodiment, at recycling stage 108, debonder 114 can be recovered by filtering debonder 114 from washing alcohol 118 as well as to filtering any one or more of the first and second components of debonder 114 comprising a mixture for recycling within system 100. It should be noted that recycling stage 108 can comprise separate filtering stages for separating debonder 114 from washing alcohol 118 and for separating individual components of debonder 114 where debonder 114 is a mixture.

As noted above, not all debonders require washing. For example, when debonders of chemical structure (II) were used, such as PGBE, without mixing with alcohol in the mixing stage 102 the PGBE can be recovered in the optional recycling stage 108 (FIG. 1, 100B) without using a washing alcohol or solvent. In such a case the CF concentration was 5.7% (w/w).

Drying Stage 106

At drying stage 106, liquid content of washed stream 122 comprising Cellulose Filaments treated with debonder 114 is reduced to form treated stream 124.

In one embodiment, drying stage 106 can remove excess moisture (e.g. water content and other liquid content such as alcohol and other debonders 114) from washed stream 122. Removing moisture from washed stream 122 can provide for the Cellulose Filaments treated with debonder 114 to evenly disperse (e.g. inhibit aggregation) in subsequent applications.

In one embodiment, Cellulose Filaments of washed stream 122 can be dried in a vacuum oven to evaporate excess moisture therein. Other drying equipment may include a convection oven and Nutsche filter.

In one example, when 66.67 grams of feedstock 110 (30 wt % Cellulose Filaments in water) is mixed with 25 grams of debonder 114 (e.g. PGBE) and 25 grams of ethanol and subsequently washed with 120 mL of ethanol and filtered using a Buchner to form washed stream 122, washed stream 122 can be dried in a vacuum oven in two stages: the first stage comprising drying washed stream 122 at 70° C. for 2 hours and the second stage comprising drying washed stream 122 at 120° C. for an additional 1 hour.

Uses in Thermoplastic Composites

The present disclosure provides thermoplastic polymer-treated Cellulose Filaments composite materials and methods for forming thermoplastic polymer-treated Cellulose filaments composite materials by associating treated Cellulose Filaments (e.g. treated with debonder 114 according to one of the embodiments described above) with a thermoplastic polymer matrix.

Herein, the term "composite" means a material which is composed of two or more materials having different physical characteristics and in which each material retains some of its identity while contributing desirable properties to the whole. For example, a thermoplastic polymer associated with treated Cellulose Filaments forms a thermoplastic polymer-treated Cellulose Filaments composite material, wherein each of the thermoplastic polymer and the treated Cellulose Filaments contributes to the mechanical properties of the composite as a whole.

Herein, "associate" means to bring into relation with one another, as if by mixing or blending. For example, a thermoplastic polymer can be associated with treated Cellulose Filaments by mixing a resin of the thermoplastic polymer with treated Cellulose Filaments and then forming (e.g. extruding) the mixture into a polymer.

Thermoplastic polymers for inclusion in the thermoplastic polymer-treated Cellulose Filaments composites described herein can include but are not limited to polyolefins such as polyethylenes (e.g. low-density polyethylene (LDPE), linear low density polyethylene (LLDPE), maleated thermoplastic starch (mTPS) in LLDPE and high-density polyethylene (HDPE)), polyurethane (PU), polypropylene (PP) (e.g. recycled), polyester (PE), polylactic acid (PLA), polyhydroxyalkanoates (PHA), polyamide (PA), and ethylene vinyl acetate (EVA).

In some embodiments, the composite materials described herein are about 30% or less by weight of the composite treated Cellulose Filaments.

In one embodiment, the thermoplastic polymer-treated Cellulose filament composite can be formed such that the composite comprises LDPE as the thermoplastic polymer in the composite. In another embodiment, the thermoplastic-treated Cellulose filament composite can be formed such that the composite comprises 50% or more by weight LDPE, preferably 60% or more by weight LDPE.

In another embodiment, the thermoplastic polymer-treated Cellulose filament composite can be formed such that the composite comprises LDPE as the thermoplastic polymer in the composite and the composite has a Young's Modulus greater than the Young's Modulus of LDPE. In one embodiment, the thermoplastic polymer-treated Cellulose filament composite can be formed such that the composite comprises LDPE as the thermoplastic polymer and the composite has a Young's Modulus gain of 109%.

In another embodiment, the thermoplastic polymer-treated Cellulose filament composite can be formed such that the composite comprises LDPE as the thermoplastic polymer in the composite and the composite has a tensile stress greater than the tensile stress of LDPE. In one embodiment, the thermoplastic polymer-treated Cellulose filament composite can be formed such that the composite comprises LDPE as the thermoplastic polymer and the composite has a tensile stress gain of 63%

In another embodiment, the thermoplastic polymer-treated Cellulose filament composite can be formed such that the composite comprises LDPE as the thermoplastic polymer in the composite and the composite has a total elongation at break less than the total elongation at break of LDPE. In one embodiment, the thermoplastic polymer-treated Cellulose filament composite can be formed such that the composite comprises LDPE as the thermoplastic polymer and the composite has an elongation at break of 10%.

In another embodiment, the thermoplastic polymer-treated Cellulose filament composite can be formed such that the composite comprises LDPE as the thermoplastic polymer in the composite and the composite has greater water absorption than LDPE. In one embodiment, the thermoplastic polymer-treated Cellulose filament composite can be formed such that the composite comprises LDPE as the thermoplastic polymer and the composite has a water absorption of 3.5-4.0% after 96 hours.

In another embodiment, the thermoplastic polymer-treated Cellulose filament composite can be formed such that the composite comprises HDPE as the thermoplastic polymer in the composite. In one embodiment, the thermoplastic polymer-treated Cellulose filament composite can be formed such that the composite comprises 50% or more by weight HDPE, preferably 60% or more by weight HDPE.

In another embodiment, the thermoplastic polymer-treated Cellulose filament composite can be formed such that the composite comprises HDPE as the thermoplastic polymer in the composite and the composite has a Young's Modulus greater than the Young's Modulus of HDPE. In one embodiment, the thermoplastic polymer-treated Cellulose filament composite can be formed such that the composite comprises HDPE as the thermoplastic polymer and the composite has a Young's Modulus gain of 63%.

In another embodiment, the thermoplastic polymer-treated Cellulose filament composite can be formed such that the composite comprises HDPE as the thermoplastic polymer in the composite and the composite has a tensile stress greater than the tensile stress of HDPE. In one embodiment, the thermoplastic polymer-treated Cellulose filament composite can be formed such that the composite comprises HDPE as the thermoplastic polymer and the composite has a tensile stress gain of 39%.

In another embodiment, the thermoplastic polymer-treated Cellulose filament composite can be formed such that the composite comprises HDPE as the thermoplastic polymer in the composite and the composite has a total elongation at break less than the total elongation at break of HDPE. In one embodiment, the thermoplastic polymer-treated Cellulose filament composite can be formed such that the composite comprises HDPE as the thermoplastic polymer and the composite has an elongation at break of about 12%.

In another embodiment, the thermoplastic polymer-treated Cellulose filament composite can be formed such that the composite comprises HDPE as the thermoplastic polymer in the composite and the composite has greater water absorption than HDPE. In one embodiment, the thermoplastic polymer-treated Cellulose filament composite can be formed such that the composite comprises HDPE as the thermoplastic polymer and the composite has a water absorption of about 7% after one year.

In another embodiment, the thermoplastic polymer-treated Cellulose filament composite can be formed such that the composite comprises PP as the thermoplastic polymer in the composite. In one embodiment, the thermoplastic polymer-treated Cellulose filament composite can be formed such that the composite comprises 50% or more by weight PP, preferably 60% or more by weight PP.

In another embodiment, the thermoplastic polymer-treated Cellulose filament composite can be formed such that the composite comprises PP as the thermoplastic polymer in the composite and the composite has a Young's Modulus greater than the Young's Modulus of PP. In one embodiment, the thermoplastic polymer-treated Cellulose filament composite can be formed such that the composite comprises PP as the thermoplastic polymer and the composite has a Young's Modulus gain of 32%.

In another embodiment, the thermoplastic polymer-treated Cellulose filament composite can be formed such that the composite comprises PP as the thermoplastic polymer in the composite and the composite has a tensile stress greater than the tensile stress of PP. In one embodiment, thermoplastic polymer-treated Cellulose filament composite can be formed such that the composite comprises PP as the thermoplastic polymer and the composite has a tensile stress gain of 30%.

In another embodiment, the thermoplastic polymer-treated Cellulose filament composite can be formed such that the composite comprises PP as the thermoplastic polymer in the composite and the composite has a total elongation at break less than the total elongation at break of PP. In one embodiment, the thermoplastic polymer-treated Cellulose filament composite can be formed such that the composite comprises PP as the thermoplastic polymer and the composite has an elongation at break of about 6%.

In another embodiment, the thermoplastic polymer-treated Cellulose filament composite can be formed such that the composite comprises PP as the thermoplastic polymer in the composite and the composite has greater water absorption than PP. In one embodiment, the thermoplastic polymer-treated Cellulose filament composite can be formed such that the composite comprises PP as the thermoplastic polymer and the composite has a water absorption of about 3.6% after 96 hours.

It is understood that blends of polymers, such as PP and PE, as described in other references regarding thermoplastics may be used herein. The compositions contemplated herein can additionally comprise conventional additives used in formation of thermoplastic polymers including plasticizers, stabilizers including viscosity stabilizers and hydrolytic stabilizers, antioxidants, ultraviolet ray absorbers, antistatic agents, dyes, pigments or other coloring agents, inorganic fillers, fire-retardants, lubricants, reinforcing agents such as glass fiber and flakes, foaming or blowing agents, processing aids, antiblock agents, release agents, and/or mixtures thereof. Optional additives, when used, can be present in various quantities so long as they are not used in an amount that detracts from the basic characteristics of the composition.

The composite composition can be produced by any methods known to one skilled in the art such as combining any type of cellulose material (e.g. treated Cellulose Filaments) with a thermoplastic polymer (e.g. a ribbon blender or any low intensity mixer commonly used in blending solids). The mixture can be processed in a heated extruder at temperatures suitable for processing the particular thermoplastic polymer chosen.

Figure 2:
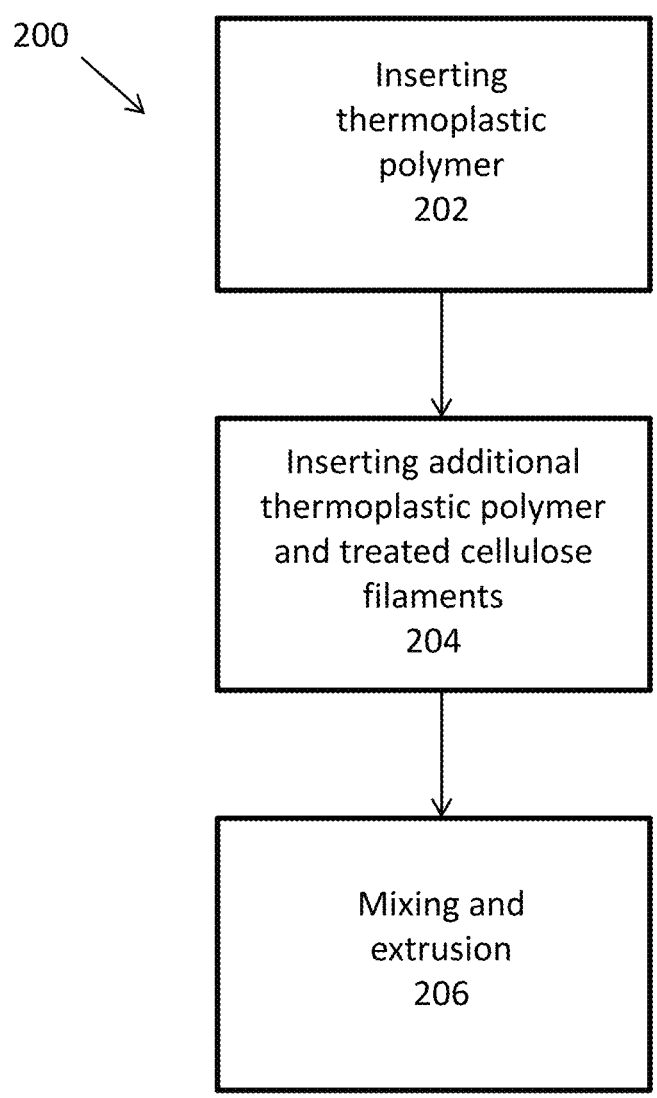
FIG. 2 is a block diagram of a method for forming a thermoplastic polymer-treated Cellulose Filaments composite.

FIG. 2 shows an exemplary method 200 for forming a thermoplastic polymer-treated Cellulose filament composite. Method 200 comprises step 202 of inserting a thermoplastic (e.g. PE, PP, etc. as described) polymer (e.g. resin) into an extruder and meting the thermoplastic polymer. At step 204, additional thermoplastic polymer and treated Cellulose Filaments are added to the extruder and mixed. At step 206, the mixed thermoplastic polymer and treated Cellulose Filaments are further mixed to obtain homogeneous samples. The resulting homogenous composite material is removed from the rolls of the extruder and can be cut into strips according to the size of the mold.

Step 202 comprises inserting a thermoplastic resin into the extruder and meting the resin. In one embodiment, the thermoplastic resin is melted on the rollers of the extruder at 170° C. (e.g. when the thermoplastic polymer is LDPE and HDPE) or 180° C. (e.g. when the thermoplastic polymer is PP).

At step 204, additional thermoplastic polymer and treated Cellulose Filaments are added to the extruder and mixed. In one embodiment, additional thermoplastic polymer and treated Cellulose Filaments are added to the extruder and mixed at 50 rpm for 7 minutes. In another embodiment, after the additional thermoplastic polymer and treated Cellulose Filaments are added to the extruder and mixed at 50 rpm for 7 minutes, the composite material can be further mixed for 15 minutes to obtain homogeneous samples.

In one specific example, 80 grams of thermoplastic (e.g. LDPE, HDPE or PP) and 20 grams of Cellulose Filaments are added to the extruder and mixed at 50 rpm for 7 minutes.

At step 206, the resulting composites can be removed from the rolls and cut into strips according to the size of the mold. The composite material can be formed into shaped articles using methods such as injection molding, compression molding, overmolding, or extrusion. Optionally, formed articles comprising the composite materials described herein can be further processed. For example, pellets, slugs, rods, ropes, sheets and molded articles of the compositions described herein may be prepared and used for feedstock for subsequent operations, such as thermoforming operations, in which the article is subjected to heat, pressure and/or other mechanical forces to produce shaped articles. Compression molding is an example of further processing.

The composite material can be cut, injection molded, compression molded, overmolded, laminated, extruded, milled or the like to provide the desired shape and size to produce commercially usable products. Examples of resultant products include: packaging, container, automotive industry (engine cover, cam cover, battery tray, door panel) etc.

The following examples are set forth to aid in the understanding of the description provided and should not be construed to limit in any way the scope of the claims which follow hereafter.

EXAMPLES

Evaluation of the Fluffiness of Treated Cellulose Filaments

Figure 3:
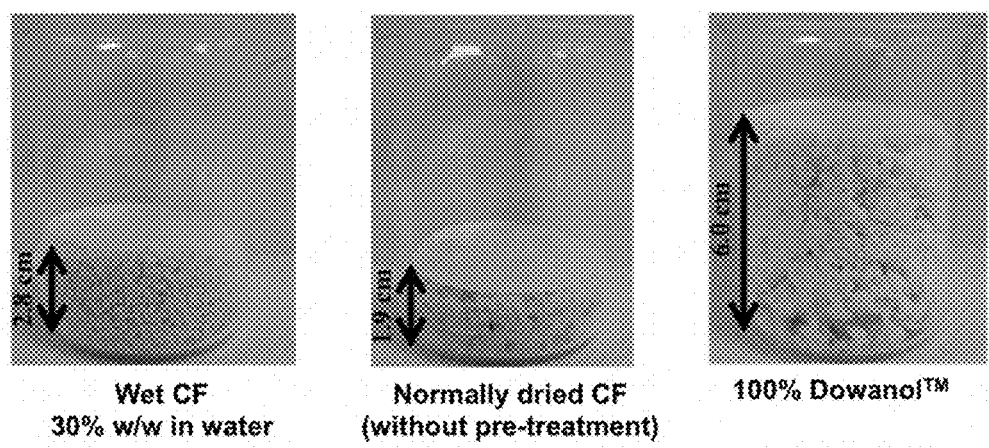
FIG. 3 shows the differences in fluffiness of Cellulose Filaments samples when treated with a debonder (e.g. Dowanol™ PnB)

The fluffiness of Cellulose Filaments gives a good appreciation of the future dispersion of Cellulose Filaments (e.g. dispersion within a thermoplastic polymer matrix). As is shown in FIG. 3, visual inspection of Cellulose Filaments with or without treatment provides that varying degrees of fluffiness are provided upon treatment of Cellulose Filaments with a debonder (e.g. propylene glycol n-butyl ether (PGBE) such as Dowanol™ PnB). Specifically, FIG. 3 shows fluffiness of samples of Cellulose Filaments (10 grams) with and without treatment (as indicated thereon).

"Fluffiness" herein refers to the Cellulose Filaments being 'light' or 'airy' such that Cellulose Filaments of equal mass with a higher fluffiness tend to resist settling under gravity more than Cellulose Filaments with lower fluffiness. Fluffiness can be measured as a quantity (e.g. weight) per unit volume.

As shown in FIG. 3, Cellulose Filaments treated with a debonder showed more fluffiness than Cellulose Filaments that were not treated with a debonder.

Figure 4:
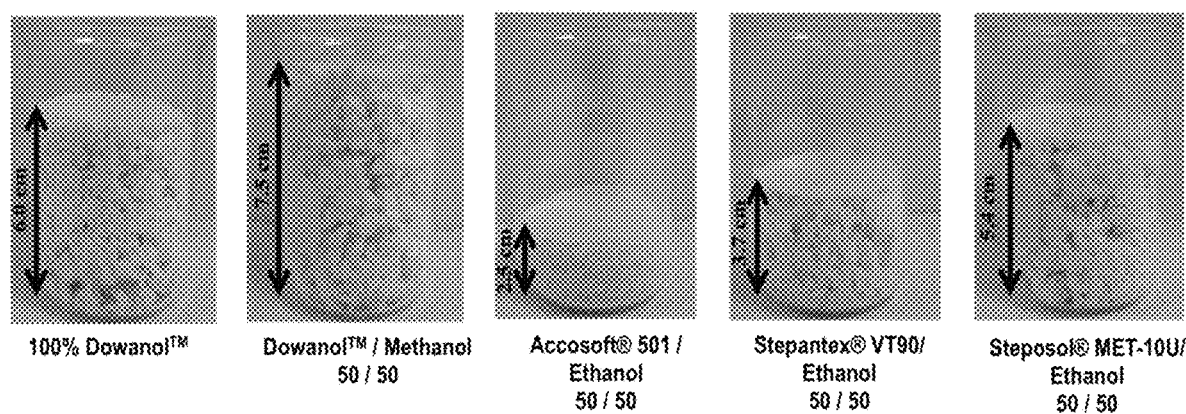
FIG. 4 shows the differences in fluffiness of Cellulose Filaments samples when treated with various debonders.
Figure 5:
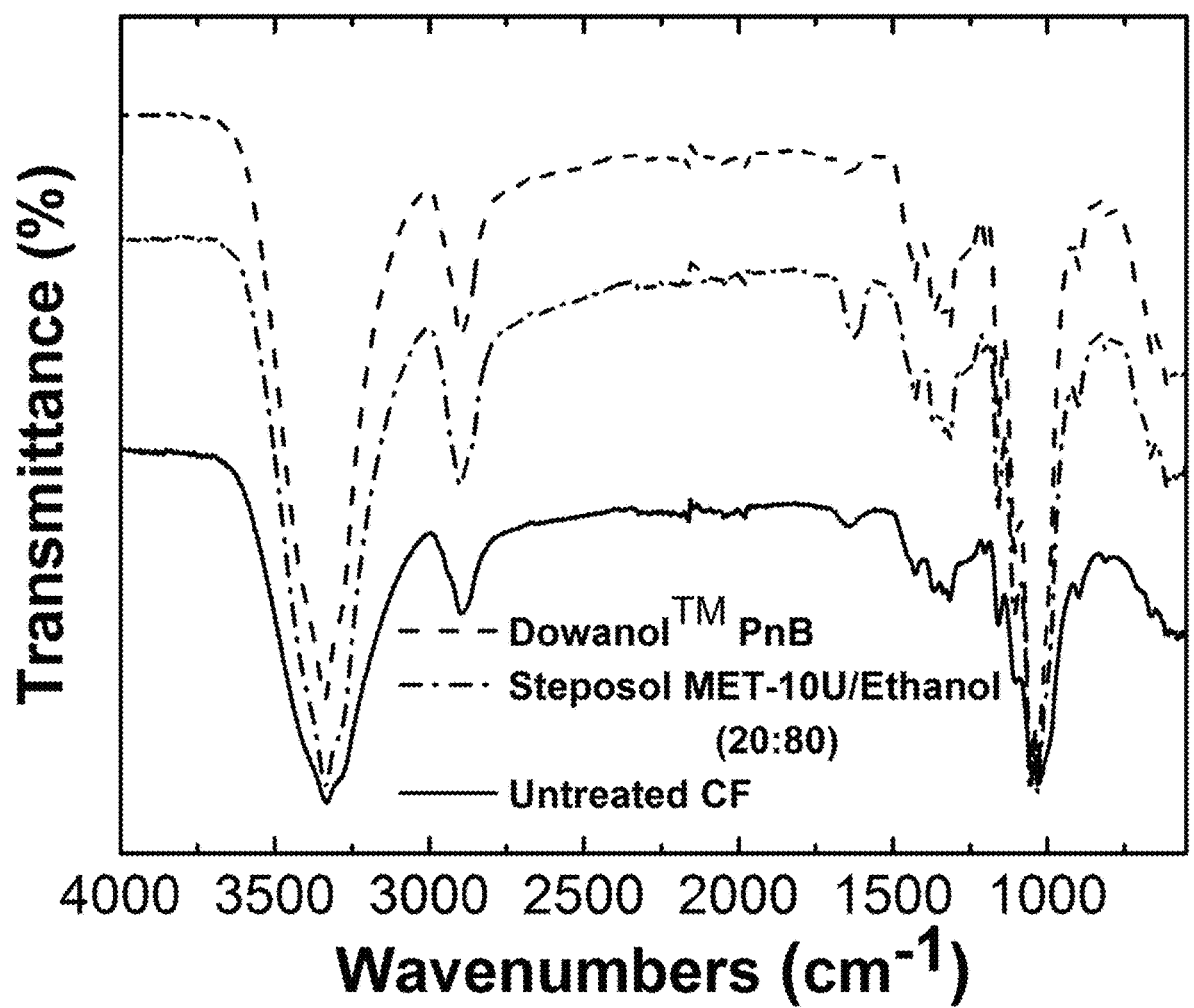
FIG. 5 shows the FT-IR spectra of Cellulose Filaments samples after two different debonders treatments and the untreated Cellulose Filaments sample

Efficiency of debonder treatment was further evaluated by visually measuring "fluffiness" of treated Cellulose Filaments. FIG. 4 shows a comparison of fluffiness of 10 grams of Cellulose Filaments that were treated with various debonders. For example, as depicted on FIG. 4, treatment with a Dowanol™ PnB/methanol mixture increased the fluffiness of Cellulose Filaments when compared to treatment with an Accosoft® 501/ethanol mixture.

Treatment of Cellulose Filaments with Debonders

In the examples below, the following debonders were used:

TABLE 1

Characteristics for the debonders used in the examples below

| Debonder | MW | Boiling point | Flash point |
| --- | --- | --- | --- |
| Propylene glycol n-butyl ether (Dowanol ™ PnB) | 132 | 171° C. | 63° C. |
| Ethanol | 46 | 78° C. | 16.60° C. |
| N,N-dimethyl 9-decenamide (Steposol ® MET-10U) | 197 | 297° C. | 134° C. |

Example 1: Treatment of Cellulose Filaments with a Mixture of PGBE/Ethanol (in a 1:1 Weight Ratio) and Incorporation of the Treated Cellulose Filaments in LDPE, HDPE and PP In one example, 66.67 grams of wet Cellulose Filaments (30% Cellulose Filaments w/w in water) and a solution of PGBE (Dowanol™ PnB)/ethanol in a 1:1 ratio by weight (25 grams of PGBE and 25 grams of ethanol) were mixed into a cake mixer during 1 hour at room temperature. 120 mL of ethanol was added to the Cellulose Filaments as a washing alcohol and debonder mixture and the resulting mixture was filtrated using a Buchner filter. The product from the filter was dried in a vacuum oven in two stages: first at 70° C. for 2 hours and then at 120° C. for 1 hour. The dried Cellulose Filaments were finely pulverized and the resulting fluffy treated Cellulose Filaments were subsequently associated with LDPE, HDPE and PP according to the method provided below.

Association of Treated Cellulose Filaments with Thermoplastic Polymers

In the examples below, the following thermoplastics were used (Table 2):

TABLE 2

Characteristics for the thermoplastic polymer matrices used in the examples below

| Thermoplastic matrix | Young's modulus (MPa) | Tensile stress (MPa) | % Elongation at break |
|---|---|---|---|
| Low-density polyethylene (LDPE) | 216 ± 34 | 19.5 ± 1.1 | >500% |
| High-density polyethylene (HDPE) | 487 ± 25 | 37.7 ± 1.8 | >100% |
| Polypropylene (PP) | 541 ± 36 | 27 ± 1.3 | |

Cellulose Filaments treated with debonders were associated with LDPE, HDPE and PP according to the following examples.

In one example, thermoplastic polymer-treated Cellulose filament composites were manufactured in two stages using a two-roller extruder (C.W Brabender® with Thermotron model T-303; C.W Brabender® Instruments, Inc. South Hackensack, N.J., USA). In the first stage, 80 grams of thermoplastic (LDPE, HDPE or PP) were melted on the rollers of the extruder at 170° C. (LDPE and HDPE) or 180° C. (PP). In the second stage, 20 grams of treated Cellulose Filaments were added and mixed at 50 rpm for 7 minutes. The composites were further mixed for 15 minutes to obtain homogeneous samples. The resulting composites were removed from the rolls and cut into strips according to the size of the mold.

The composites were molded into dumb-bell shapes (e.g. ASTM D638-type V) for mechanical property testing. A total of 10 tensile samples were prepared at 170±3° C. for 10 minutes, in a single mold of a Dake brand press (from Dake Division of JSJ Corporation) at 15 MPa. The mold was cooled by cold water circulation until 60° C.

The same procedure was used to prepare composite made with 10%, 30% and 40% w/w of treated Cellulose Filaments.

Mechanical Properties Studies

Composites formed as described above were conditioned overnight in a testing room at 23° C. and 50% relative humidity, polished and measured with a micrometer prior to testing. The mechanical measurements were performed on an Instron tester (model 4201; Norwood, Mass., USA). Each specimen had an approximate width of 0.28-0.30 cm and an approximate thickness of 0.32-0.34 cm. A minimum of five samples were tested in each series. The mechanical properties obtained for each series of composites are depicted below.

Figure 6:
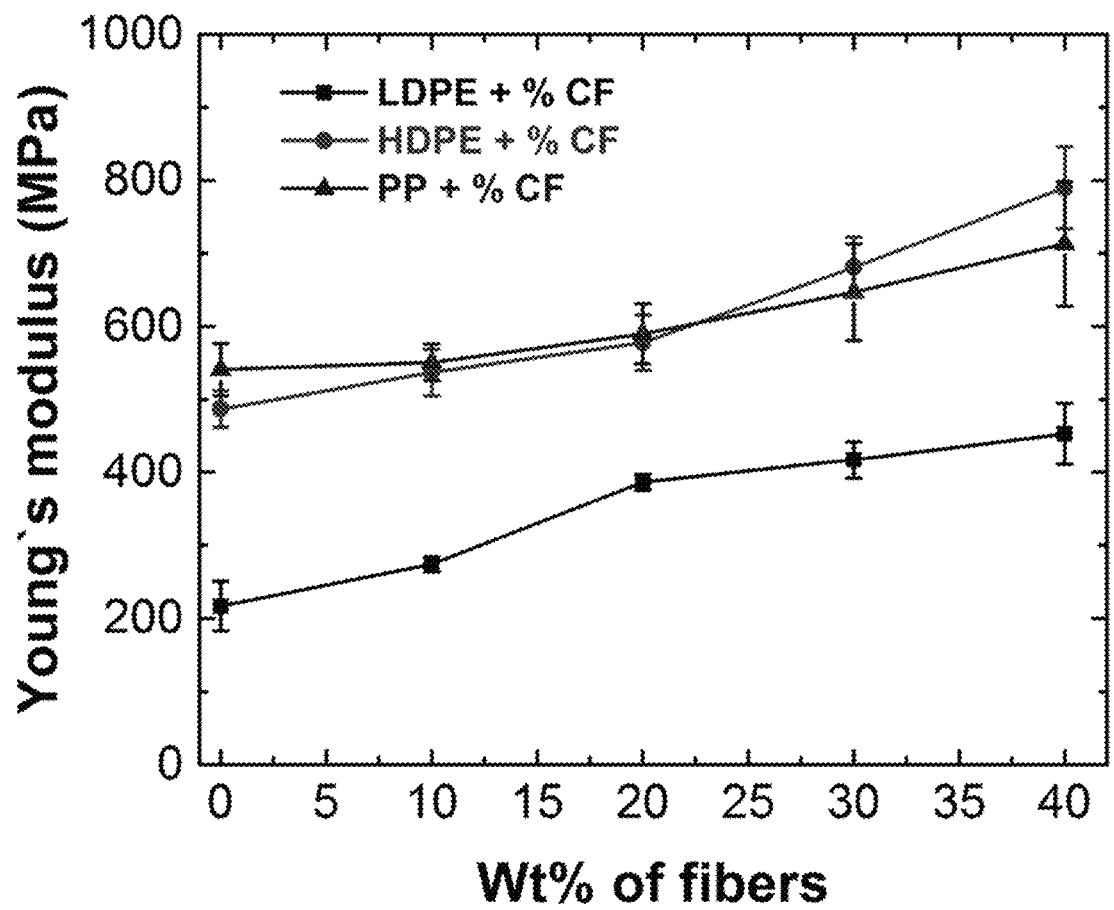
FIG. 6 shows a graph depicting Young's modulus for three different thermoplastic polymer-Cellulose Filaments composites prepared with varying weight percentages of Cellulose Filaments.

FIG. 6 shows a graph depicting Young's Modulus for three different thermoplastic polymer-treated Cellulose filament composites prepared with varying weight percentages of Cellulose Filaments.

Figure 7:
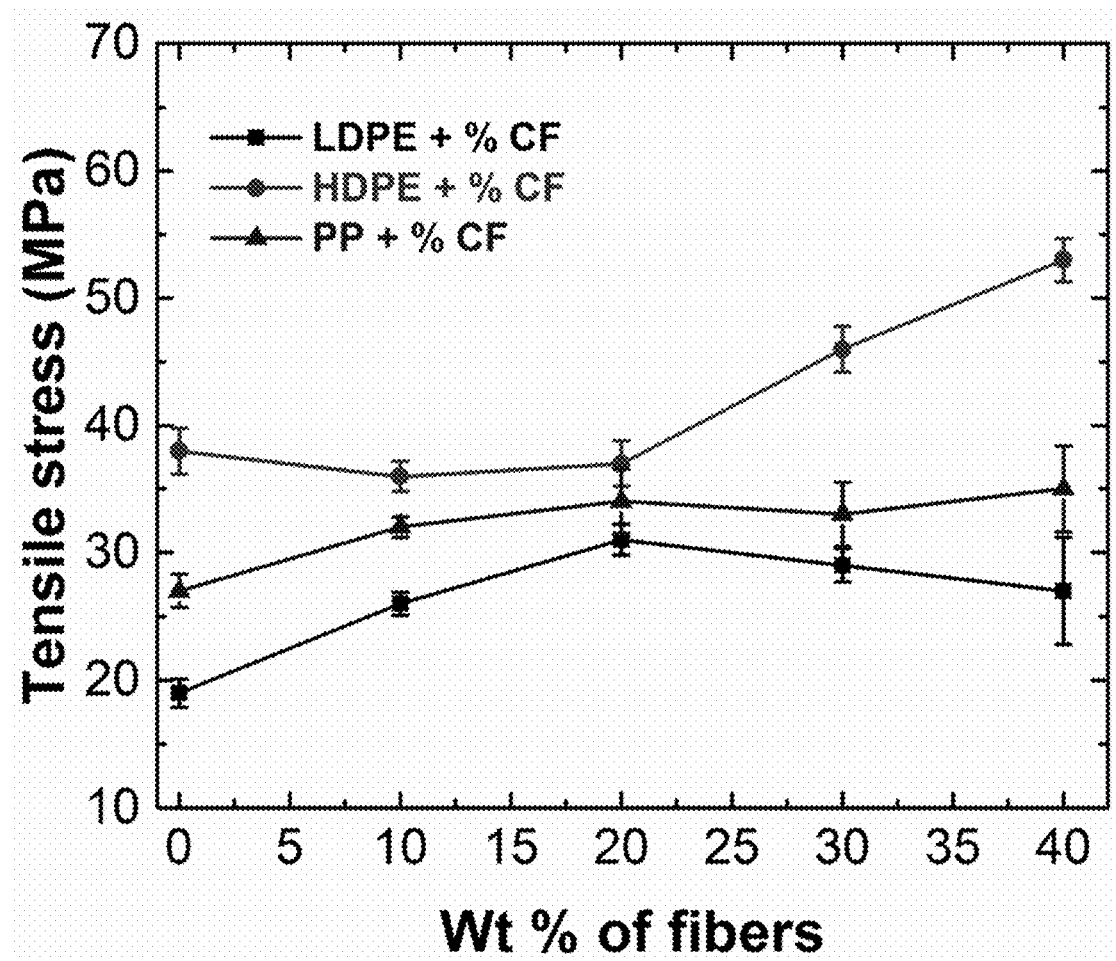
FIG. 7 shows a graph depicting tensile stress for three different thermoplastic polymer-Cellulose filaments composites prepared with varying weight percentages of Cellulose Filaments.

FIG. 7 shows a graph depicting tensile stress for three different thermoplastic polymer-treated Cellulose filament composites prepared with varying weight percentages of Cellulose Filaments.

As shown in FIG. 7, the tensile properties of thermoplastics are largely improved (e.g. increased Young's Modulus and increased tensile stress) by adding treated Cellulose Filaments to each thermoplastic polymer matrix as treated Cellulose Filaments generally have higher stress and stiffness values than those of the thermoplastic polymer.

Association of treated Cellulose Filaments in thermoplastic polymers as described resulted in a significant decrease of the total elongation at break (see Table 3). This may be attributable to the lower elongation values of treated Cellulose Filaments when compared to each thermoplastic polymer used. Such a modification of elongation suggests a transition from a ductile behavior corresponding to a thermoplastic composite to a rather brittle character.

TABLE 3

Elongation at break (%) for different thermoplastic polymer-treated Cellulose filament composites

| | Low-density polyethylene (LDPE) | | | | | High-density polyethylene (HDPE) | | | | | Polypropylene (PP) | | | | |
|---|---|---|---|---|---|---|---|---|---|---|---|---|---|---|---|
| | % Wt of Cellulose Filaments | | | | | | | | | | | | | | |
| | 0 | 10 | 20 | 30 | 40 | 0 | 10 | 20 | 30 | 40 | 0 | 10 | 20 | 30 | 40 |
| Total elongation at break (%) | >500 | 38 | 17 | 15 | 10 | >100 | 15 | 12 | 13 | 12 | 15 | 13 | 9 | 8 | 6 |

Water Absorption of Thermoplastic-Treated Cellulose Filament Composites

Rectangular samples were cut from each thermoplastic polymer-treated Cellulose filament composite with dimension size of approximately 21 mm×9.5 mm×2.9 mm. These samples were soaked in distilled water and removed at different times, wiped with filter paper and dried with compressed air. The samples were weighed regularly at 20, 48, 72 and 96 hours, 1 month and 6 months exposure with an analytical balance with 0.1 mg resolution. Water absorption was calculated according to the following formula:

Increase in weight (%)=[(Wet weight−Initial weight)/ Initial weight]×100

Figure 8:
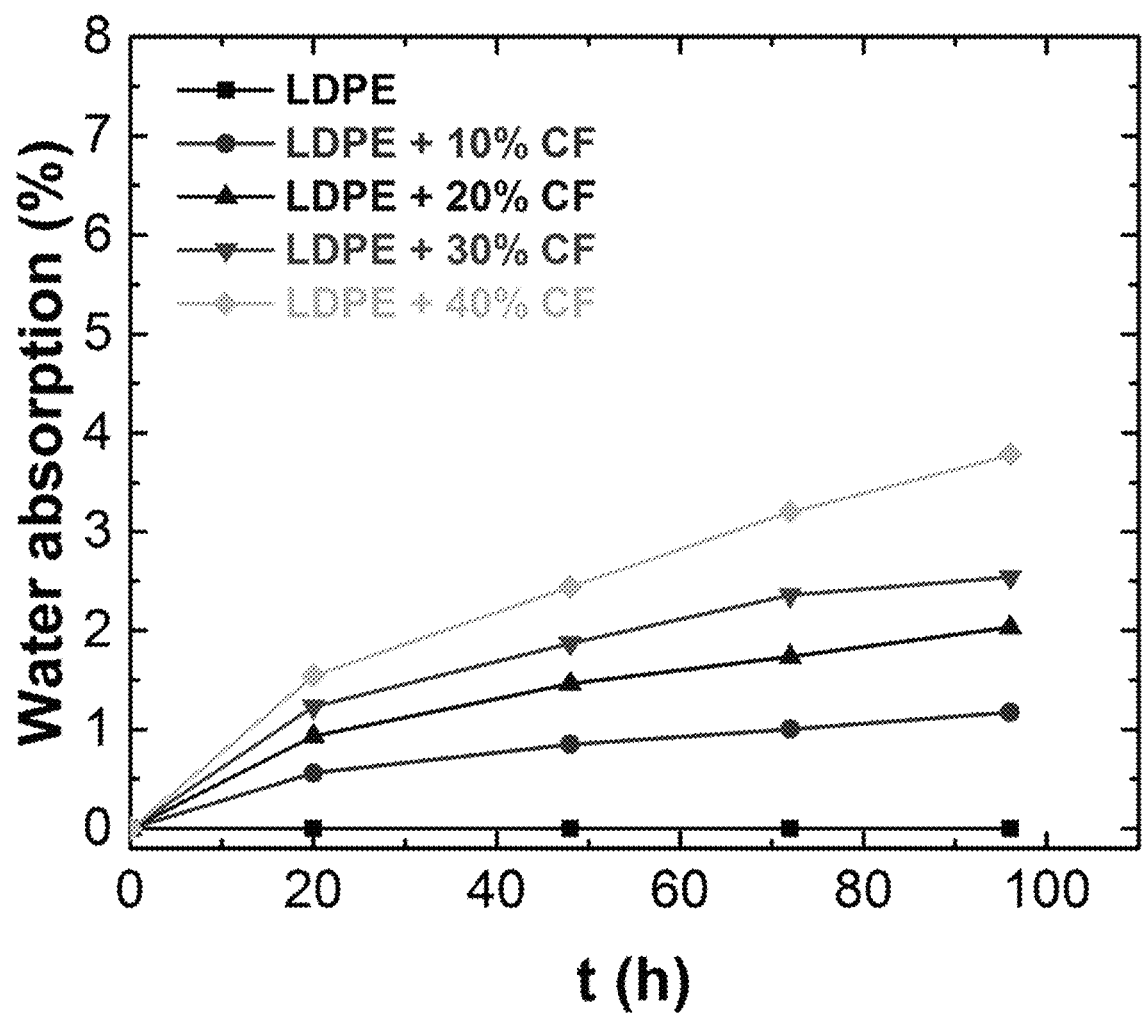
FIG. 8 shows water absorption percentages over time for various low-density polyethylene (LDPE)-Cellulose filaments composites prepared with varying weight percentages of Cellulose Filaments.
Figure 9:
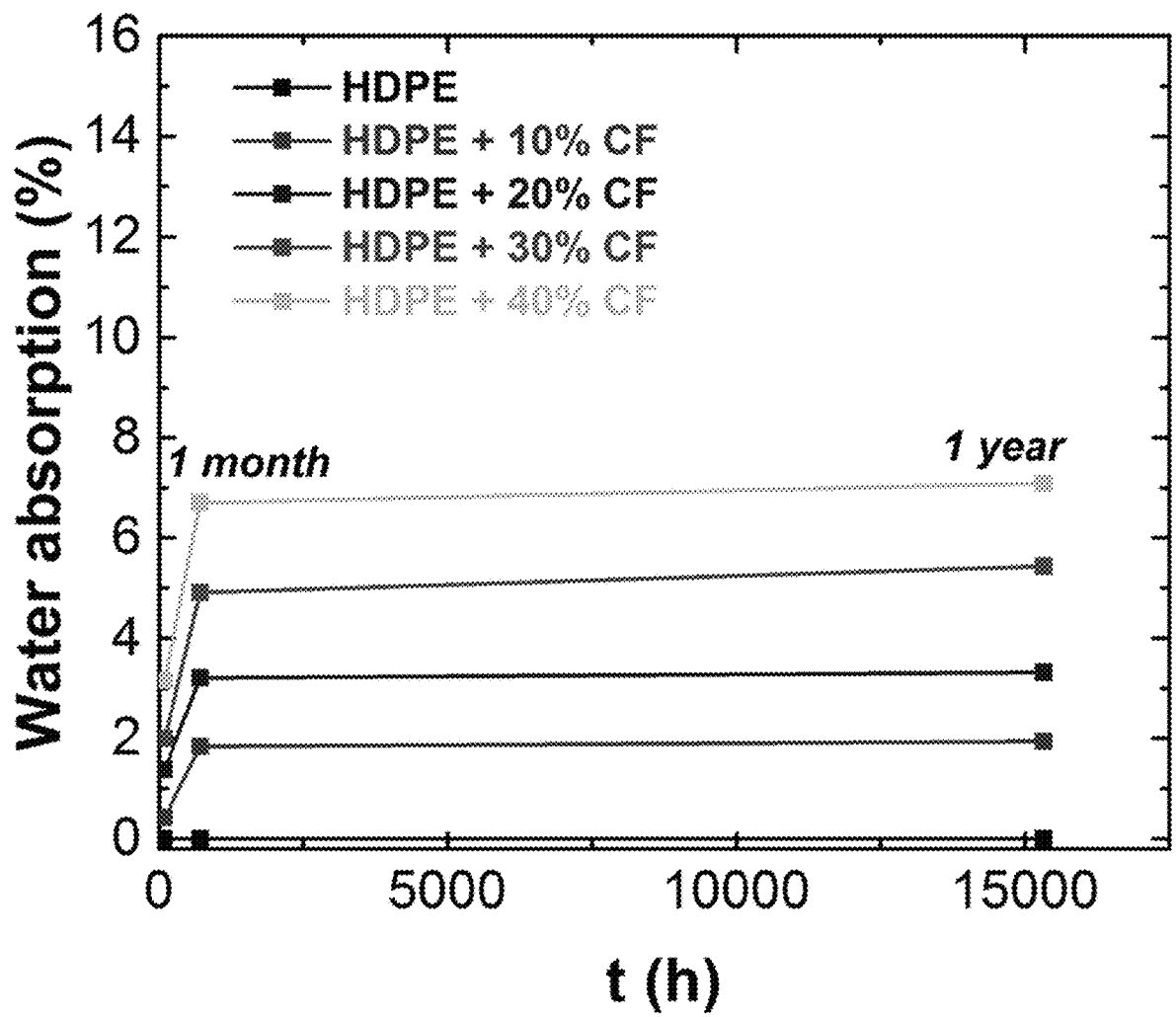
FIG. 9 shows water absorption percentages over time for various high-density polyethylene (HDPE)-Cellulose filaments composites prepared with varying weight percentages of Cellulose Filaments.
Figure 10:
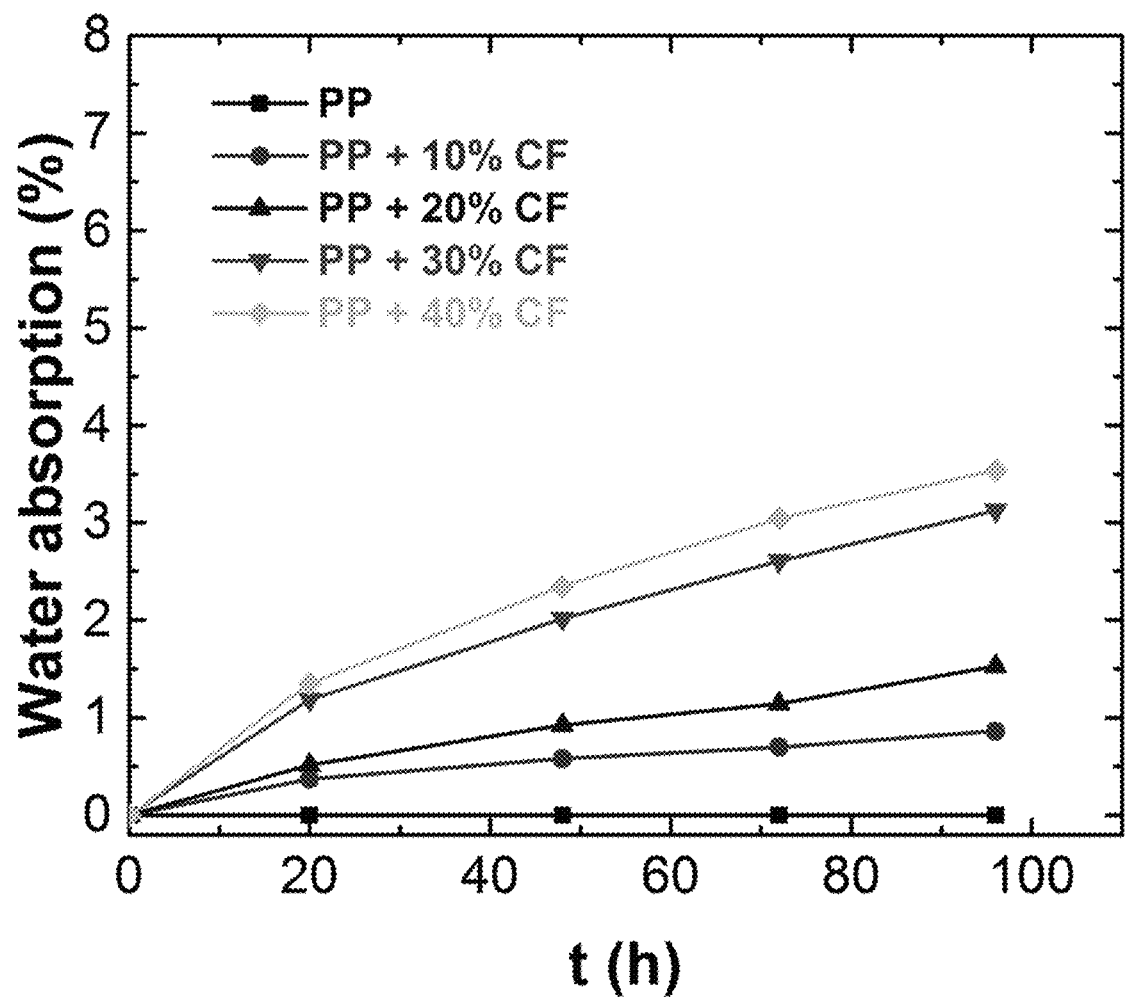
FIG. 10 shows water absorption percentages over time for various polypropylene (PP)-Cellulose filaments composites prepared with varying weight percentages of Cellulose Filaments.

FIGS. 8 to 10 show water absorption for treated Cellulose Filaments composites with LDPE, HDPE and PP, respectively.

The results indicate that the water absorption characteristics of the thermoplastic polymers were modified by the addition treated Cellulose Filaments. This may be due to the great affinity to water of the treated Cellulose Filaments.

Generally, water absorption of the composites increased with increased weight percentages of treated Cellulose Filaments to the thermoplastic resin. The evolution of water absorption over time is described for the LDPE-treated Cellulose filament composites at different weight percentages of treated Cellulose Filaments (FIG. 8), HDPE-treated Cellulose filament composites at different weight percentages of treated Cellulose Filaments (FIG. 9) and PP-treated Cellulose filament composites at different weight percentages of treated Cellulose Filaments (FIG. 10). An increase in water absorption over the water absorption of each polymer matrix alone is noted with the addition of treated Cellulose Filaments in each composite.

Example 2: Treatment of Cellulose Filaments with PGBE and Incorporation of the Treated Cellulose Filaments in LDPE In one example, 66.67 grams of wet Cellulose Filaments (30% Cellulose Filaments w/w in water) and 304 grams of PGBE (Dowanol™ PnB) were mixed into a cake mixer during 15 minutes at room temperature. The resulting mixture was filtrated using a Buchner filter. The product from the filter was dried in a vacuum oven in two stages: first at 70° C. for 2 hours and then at 120° C. for 1 hour. The dried Cellulose Filaments were finely pulverized and the resulting fluffy treated Cellulose Filaments were associated with LDPE to form composite materials.

Incorporation of Treated Cellulose Filaments into Thermoplastic Matrices

The procedure described above in Example 1 was used to prepare the different thermoplastic polymer matrices.

Mechanical Properties Studies

The procedure described above in Example 1 was used to study the mechanical properties of thermoplastic polymer-treated Cellulose filament composites where the treated Cellulose Filaments were treated with PGBE (Dowanol™ PnB). The mechanical properties obtained for a composite prepared with 20% of treated Cellulose Filaments and 80% of LDPE are described in Table 4.

TABLE 4

| Mechanical properties for a composite 20% treated Cellulose Filaments - 80% polyethylene | | |
|---|---|---|
| Young's modulus (MPa) | Tensile stress (MPa) | % Elongation at break |
| 386 ± 11 | 31 ± 1.2 | 15% |

Example 3: Treatment of Cellulose Filaments with a Mixture of N,N-Dimethyl 9-Decenamide (Steposol® MET-10U)/Ethanol in a Ratio of 1:4 by Weight and Incorporation of the Treated Cellulose Filaments in LDPE 66.67 g of wet Cellulose Filaments (30% Cellulose Filaments w/w in water) and a solution of N,N-dimethyl 9-decenamide (Steposol® MET-10U)/ethanol in a 1:4 ratio by weight (e.g. 10 grams of Steposol® MET-10U and 40 grams of ethanol) were mixed into a cake mixer during 1 hour at room temperature. 2×200 mL of ethanol was added and the mixture of Cellulose Filaments and debonder and the resulting mixture was filtrated using a Buchner filter. The resulting mixture was dried in a vacuum oven in two stages: first at 70° C. for 2 hours and then at 120° C. for 1 hour. The dried Cellulose Filaments were finely pulverized and the resulting fluffy treated Cellulose Filaments were then used to form composite materials with LDPE.

Incorporation of Treated Cellulose Filaments into Thermoplastic Matrices

The procedure described above in Example 1 was used to prepare the different thermoplastic polymer matrices.

Mechanical Properties Studies

The procedure described above in Example 1 was used to study the mechanical properties of thermoplastic polymer-treated Cellulose filament composites where the treated Cellulose Filaments were treated with Steposol® MET-10U/ethanol in a 1:4 ratio as a debonder. The mechanical properties obtained for a composite prepared with 20% of treated Cellulose Filaments and 80% of LDPE are described in Table 5.

TABLE 5

| Mechanical properties for a composite 20% treated Cellulose Filaments - 80% polyethylene | | |
|---|---|---|
| Young's modulus (MPa) | Tensile stress (MPa) | % Elongation at break |
| 323 ± 9 | 25.3 ± 1.1 | 19% |

Water Absorption of Cellulose Filament Composites

Figure 11:
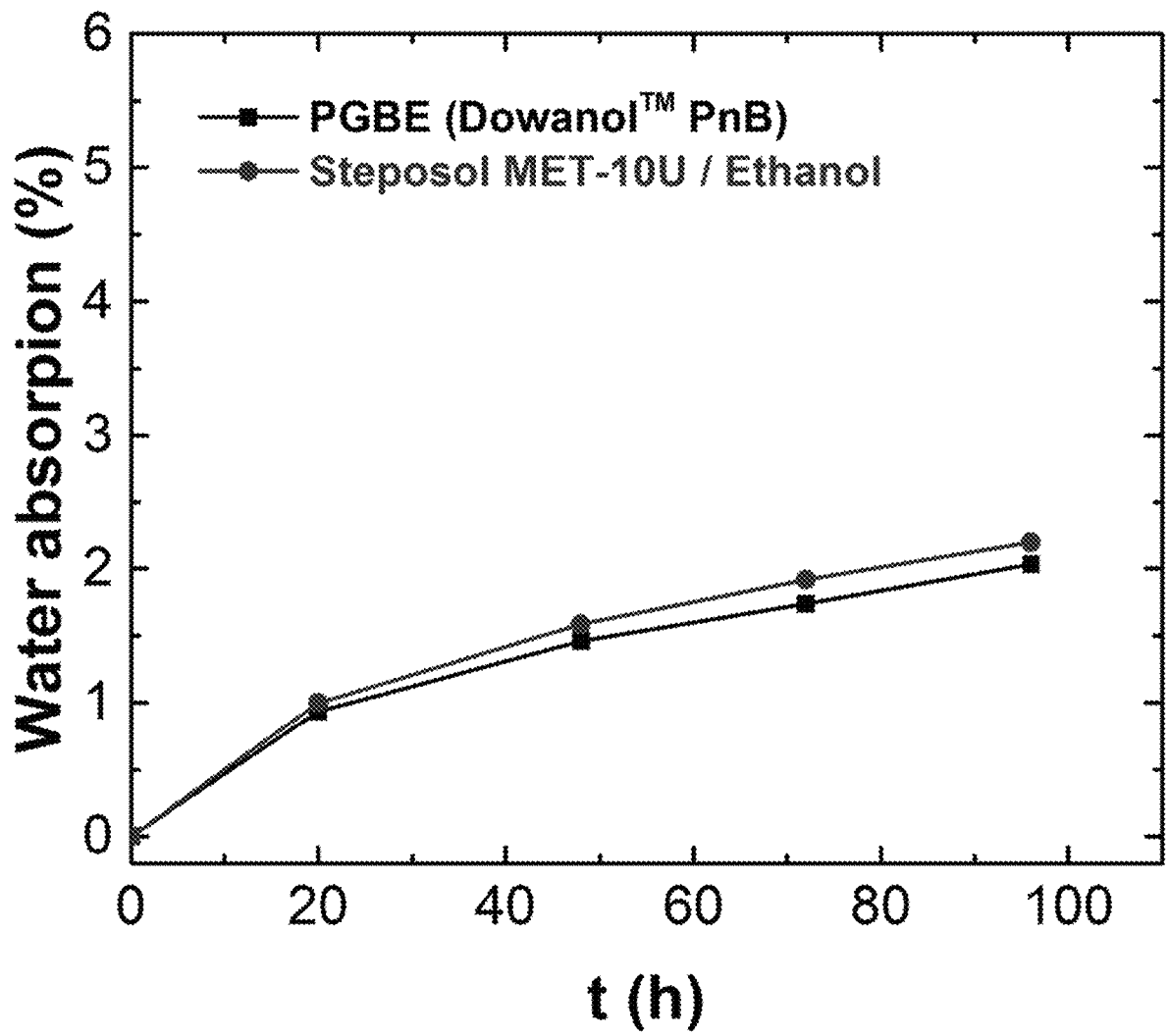
FIG. 11 shows water absorption percentages over time for various LDPE-Cellulose Filaments composites, where the Cellulose Filaments were treated with either propylene glycol n-butyl ether (Dowanol™ PnB) or Steposol® MET-10U/ethanol.

The procedure described above in Example 1 was used to study water absorption of thermoplastic polymer-treated Cellulose filament composites where the treated Cellulose Filaments were treated with Steposol® MET-10U/ethanol in a 1:4 ratio by weight. The water absorptions observed for the thermoplastic polymer-treated Cellulose filament composites treated respectively with PGBE ((Dowanol™ PnB) and N, N-dimethyl 9-decenamide (Steposol® MET-10U)/ethanol are depicted in FIG. 11.

Treatment of Cellulose Filaments with different debonders (e.g. Dowanol™ PnB and Steposol® MET-10U/ethanol) does not appear to significantly alter the water absorption of the resulting composites.

Figure 12:
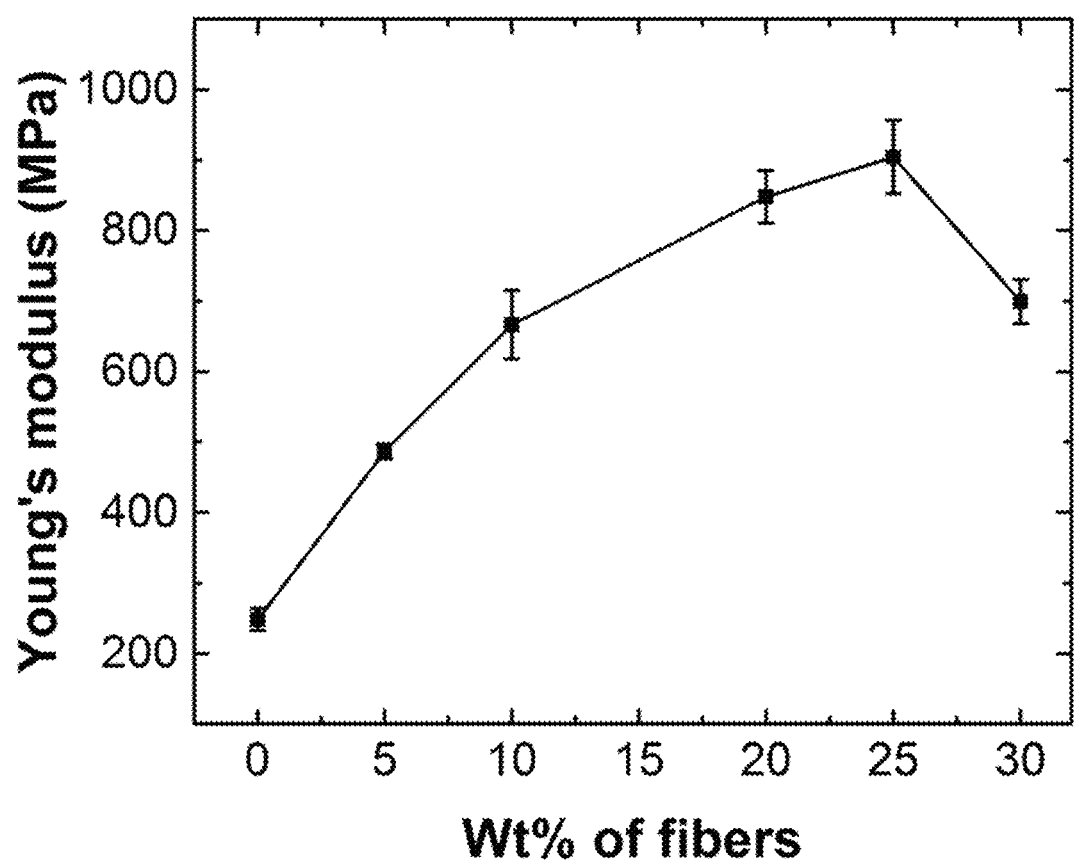
FIG. 12 shows a graph depicting Young's modulus for PA-Cellulose Filaments composites prepared with varying weight percentages of Cellulose Filaments.
Figure 13:
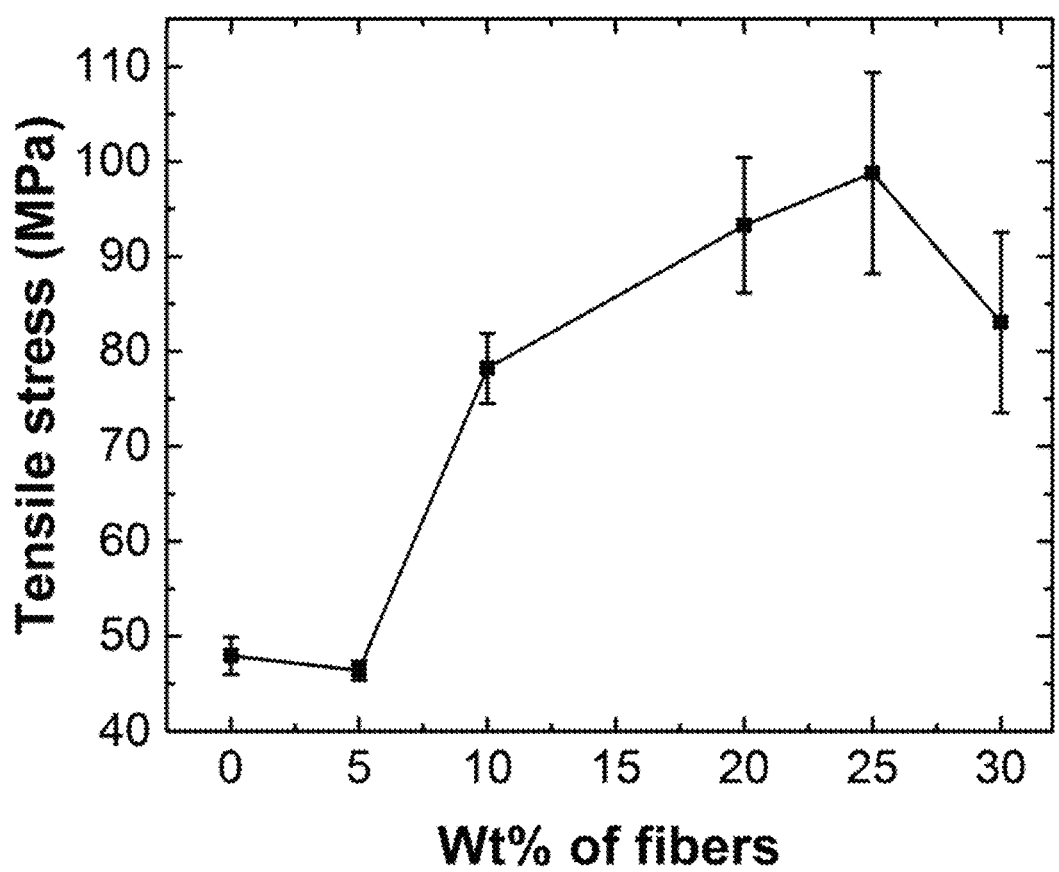
FIG. 13 shows a graph depicting tensile stress PA-Cellulose filaments composites prepared with varying weight percentages of Cellulose Filaments.

FIG. 12 shows a graph depicting Young's modulus for PA-Cellulose Filaments composites prepared with varying weight percentages of Cellulose Filaments; and FIG. 13 shows a graph depicting tensile stress PA-Cellulose filaments composites prepared with varying weight percentages of Cellulose Filaments.

What is claimed is:

1. A method comprising:
   mixing a feedstock comprising Cellulose Filaments in a water solution with a debonder to produce a mixed stream, the debonder comprising one of an alcohol, glycol ether, ester-containing quaternary ammonium salt, amido amine quaternary ammonium salt, disubstituted amide or a mixture thereof; and
   drying a filtered stream, comprising the Cellulose Filaments obtained from the mixed stream, to produce treated Cellulose Filaments.

2. The method of claim 1, wherein during mixing, the debonder adsorbs to a surface of the Cellulose Filaments in a manner such that the debonder physically blocks hydroxyl groups on the surface of the Cellulose Filaments from contacting adjacent Cellulose Filaments, thereby weakening the effects of hydrogen bonding between hydroxyl groups of adjacent Cellulose Filaments.

3. The method of claim 1 wherein the Cellulose Filaments in the feedstock comprise individual fine threads unraveled or peeled from natural cellulose fibers having a fibrillar element width ranging from nanoscale (30 to 100 nm) to microscale (100 to 500 nm) and an aspect ratio of up to 5,000.

4. The method of claim 1, wherein the feedstock has a solids content of 30% Cellulose Filaments by weight.

5. The method of claim 1 comprising, after mixing and before a filtering, washing the mixed stream with a washing alcohol or organic solvent.

6. The method of claim 5 wherein the debonder comprises one of an ester-containing quaternary ammonium salt, an amido amine quaternary ammonium salt and a disubstituted amide.

7. The method of claim 1 further comprising recovering the debonder from a filtrate stream obtained from the mixed stream and recycling the debonder to the mixing stage.

8. The method of claim 1 comprising drying the filtered stream in two stages.

9. The method of claim 1, further comprising associating the treated Cellulose Filaments and a thermoplastic polymer to produce a thermoplastic polymer and treated Cellulose Filaments composite material.

10. The method of claim 9 wherein the composite material comprises 10 to 40% by weight treated Cellulose Filaments.

11. The method of claim 9 wherein associating comprises mixing the treated Cellulose Filaments and the thermoplastic polymer to form a mixture and extruding the mixture.

12. The method of claim 9 wherein the thermoplastic polymer is one of a polyolefin, polyurethane (PU), polypropylene (PP), polyester (PE), polylactic acid (PLA), polyhydroxyalkanoates (PHA), polyamide (PA), and ethylene vinyl acetate (EVA) or a mixture.

13. The method of claim 12 wherein the polyolefin comprises a polyethylene and wherein the polyethylene comprises low-density polyethylene (LDPE), linear low density polyethylene (LLDPE), maleated thermoplastic starch (mTPS) in LLDPE and/or high-density polyethylene (HDPE).

14. The method of claim 11 wherein the thermoplastic polymer is PA and the composite material comprises 30% by weight treated Cellulose Filaments.

15. The method of claim 11 wherein the composite material has a Young's Modulus gain of 181% compared to the thermoplastic polymer alone.

16. The method of claim 11 wherein the composite material has a tensile stress gain of 73% compared to the thermoplastic polymer alone.

17. A system to produce treated Cellulose Filaments, the system comprising:
a mixing stage for mixing a feedstock comprising Cellulose Filaments in a water solution with a debonder comprising one of an alcohol, glycol ether, ester-containing quaternary ammonium salt, amido amine quaternary ammonium salt, disubstituted amide or a mixture thereof; and
a drying stage to produce the treated Cellulose Filaments.

18. The system of claim 17, further comprising a filtering stage for filtering a mixed stream comprising the debonder and Cellulose Filaments output from the mixing stage, the filter stage producing a filtered stream and a filtrate stream, the filtrate stream comprising at least a portion of the debonder.

19. The system of claim 17 configured to add a washing alcohol or organic solvent to a mixed stream, produced by the mixing stage, to wash the Cellulose Filaments of the mixed stream prior to a filtering by a filtering stage.

20. The system of claim 19 further comprising a recycling stage configured to recover the debonder, after the filtering, to recycle the debonder to the mixing stage.

21. A method comprising:
treating a feedstock comprising Cellulose Filaments in a water solution with a debonder comprising one of an alcohol, glycol ether, ester-containing quaternary ammonium salt, amido amine quaternary ammonium salt, disubstituted amide or a mixture thereof to produce treated Cellulose Filaments; and
providing the treated Cellulose Filaments for use to prepare a product comprising a thermoplastic polymer and treated Cellulose Filaments composite material.

22. A Cellulose Filaments product comprising treated Cellulose Filaments, wherein the treated Cellulose Filaments comprise Cellulose Filaments treated using a debonder comprising one of an alcohol, glycol ether, ester-containing quaternary ammonium salt, amido amine quaternary ammonium salt, disubstituted amide or a mixture thereof in a water solution; and wherein the product is a thermoplastic polymer and treated Cellulose Filaments composite material.

23. The Cellulose Filaments product of claim 22 wherein the treated Cellulose Filaments are dried after a treatment with the debonder.

24. The Cellulose Filaments product of claim 22, comprising an extruded mixture of the treated Cellulose Filaments and the thermoplastic polymer.

25. The Cellulose Filaments product of claim 22, wherein the thermoplastic polymer is one of a polyolefin, polyurethane (PU), polypropylene (PP), polyester (PE), polylactic acid (PLA), polyhydroxyalkanoates (PHA), polyamide (PA), and ethylene vinyl acetate (EVA) or a mixture.

26. The Cellulose Filaments product of claim 25 wherein the polyolefin comprises a polyethylene and wherein the polyethylene comprises low-density polyethylene (LDPE), linear low density polyethylene (LLDPE), maleated thermoplastic starch (mTPS) in LLDPE and/or high-density polyethylene (HDPE).

27. The Cellulose Filaments product of claim 22, wherein the treated Cellulose Filaments comprise Cellulose Filaments having individual fine threads unraveled or peeled from natural cellulose fibers having a fibrillar element width ranging from nanoscale (30 to 100 nm) to microscale (100 to 500 nm) and an aspect ratio of up to 5,000.

28. The Cellulose Filaments product of claim 24, wherein the composite material comprises 10 to 40% by weight treated Cellulose Filaments.

29. The Cellulose Filaments product of claim 22, wherein at least one of:
the thermoplastic polymer is polyamide (PA) and the composite material comprises 30% by weight treated Cellulose Filaments;
the composite material has a Young's Modulus gain of 181% compared to the thermoplastic polymer alone; and
the composite material has a tensile stress gain of 73% compared to the thermoplastic polymer alone.

* * * * *